United States Patent [19]

Hasty et al.

[11] Patent Number: 5,393,935
[45] Date of Patent: Feb. 28, 1995

[54] PORTABLE SCALE

[75] Inventors: Byron E. Hasty, Flower Mound; John A. Carbona, Dallas, both of Tex.

[73] Assignee: CH Administration, Inc., Dallas, Tex.

[21] Appl. No.: 89,237

[22] Filed: Jul. 9, 1993

[51] Int. Cl.6 .................. G01G 23/18; G01G 21/00; G01G 19/52

[52] U.S. Cl. ...................... 177/45; 177/126; 177/144

[58] Field of Search ............... 177/45, 126, 127, 144

[56] References Cited

U.S. PATENT DOCUMENTS 4,363,368 12/1982 Paddon et al. .................. 177/144
4,817,610 4/1989 Lee ............................. 177/144 X
5,092,415 3/1992 Asano ........................... 177/144 X Primary Examiner—George H. Miller, Jr.
Attorney, Agent, or Firm—Ross, Howison, Clapp & Korn

[57] ABSTRACT

A portable patient scale has a flexible carrier which may be placed under a hospital bed mattress. Pockets in the carrier hold weighing slats. Each slat has an upper beam and lower beam, with load cells interconnecting the beam on opposite ends of the slat. A microprocessor receives load cell signals to calculate the weight applied to the scale. The microprocessor may also produce a moving out of bed alarm by comparing signals from the load cells on opposite sides of the bed.

10 Claims, 3 Drawing Sheets

PORTABLE SCALE

TECHNICAL FIELD OF THE INVENTION

This invention relates to scales for weighing patients, and more particularly to a portable scale for placement under the mattress of a patient's bed for recording patient weight, and if desired, for providing a moving out of bed alarm.

BACKGROUND OF THE INVENTION

In connection with the medical care of bedridden patients, considerable attention has been directed over the years to the provision of weighing mechanisms for monitoring patient weight. For example, beds have been built incorporating weighing scale mechanisms. This approach is capable of providing accurate patient weight information, and has been widely used in the hospital bed industry. There is significant economic inefficiency, however, in providing such elaborate and relatively expensive mechanisms as a permanent feature in a bed. The feature is used only when the patient requires it, which is relatively infrequently for general care hospital beds. Thus, many have proposed apparatus which is not tied to a single bed on a permanent basis. Portable floor scales which can be moved from room to room to weigh the entire bed have been utilized. Another approach that has seen clinical application is the provision of scales which hoist the patient just off the bed and suspend him from above while the weighing step is completed.

All of the foregoing approaches have deficiencies with respect to the size and complexity of the apparatus. They are relatively expensive and lack versatility.

This invention contemplates a portable scale which may be easily stored and transported. When patient weight monitoring becomes significant in the clinical care of a particular patient, it may be readily placed in operation by placement under the patient mattress.

SUMMARY OF THE INVENTION

In accordance with the present invention, there is provided a portable scale which may be placed under the mattress of a patient bed only when needed for monitoring the weight of a particular bedridden patient. The scale includes a flexible carrier of a size generally corresponding to the bed, which may be placed under the bed mattress. A plurality of weighing slats are positioned in the carrier in parallel array extending transversely of the carrier. Each weighing slat has an upper beam and a lower beam movably spaced apart by at least two load cells. The load cells are located on opposite sides of the center of the slat so that they can measure deflection of the upper beam with respect to the lower beam when a vertical load is applied to the slat by reason of the patient lying on the mattress. The apparatus includes means for receiving the signals from the load cells for calculating the magnitude of the load placed on the scale.

In the preferred embodiment, a large number of relatively narrow slats are provided so that the scale may be transported from place to place simply by rolling up the carrier with the slats in place. It is desirable that the carrier maintain a maximum gap between adjacent weighing slats of no more than 200% of the relaxed height of the slats. In a specific form of the invention, the carrier is provided with a plurality of pockets for receiving the weighing slats and controlling the gap between adjacent weighing slats. Preferably, the width of each weighing slat is no more than about 7 inches. This arrangement provides a scale which readily conforms to all styles of articulated hospital beds, and is well adapted to patient comfort.

In a specific embodiment, a moving out of bed alarm may be provided in the scale apparatus by comparing signals from load cells located on opposite sides of the bed.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
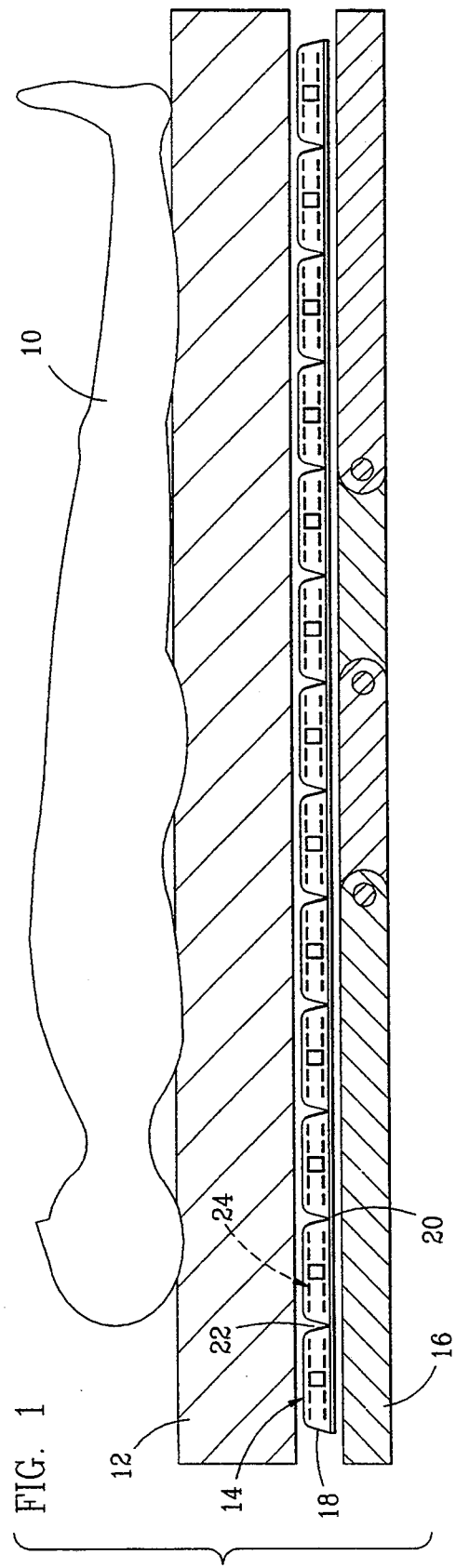
FIG. 1 is a side view of the portable scale constructed in accordance with this invention in position under a patient bed mattress.

A patient 10 is shown in FIG. 1 lying atop a conventional bed mattress 12. A portable scale constructed in accordance with this invention is designated by the reference numeral 14, and is positioned underneath the mattress 12 atop conventional hospital bed frame 16. The scale 14 may be placed between any conventional bed, mattress 12 and bed frame 16, including the bed frame depicted with four articulated sections pivoted at spaced locations along the length of the bed. Scale 14 includes a flexible carrier 18 having a flat dimension corresponding to that of mattress 12. Flexible carrier 18 may be formed from a woven fabric or any suitable nonwoven flexible material. Carrier 18 includes a web 20 extending along its entire length and breadth, and holding in position a plurality of pockets 22 which extend transversely across the bed. Each pocket 22 has slidably received therein a weighing slat 24.

In the form depicted in FIG. 1, the scale is arranged so that there are a total of thirteen pockets 22 containing weighing slats 24. While the precise number is not critical, it is important that there be at least ten or so slats covering the length of the bed, so that the scale when in position does not significantly interfere with the articulation of the bed as different segments are rotated to provide a different bed posture for the patient. Moreover, the slats should be no more than about seven inches wide, and preferably about five inches wide, so that the scale may be easily arranged for transportation and storage by rolling up the flexible carrier 18. This arrangement will conform to different configurations of hospital beds. Moreover, it will not interfere with patient comfort. Although not shown in the drawings, the entire scale may be enveloped within a moistureproof covering.

Figure 3:
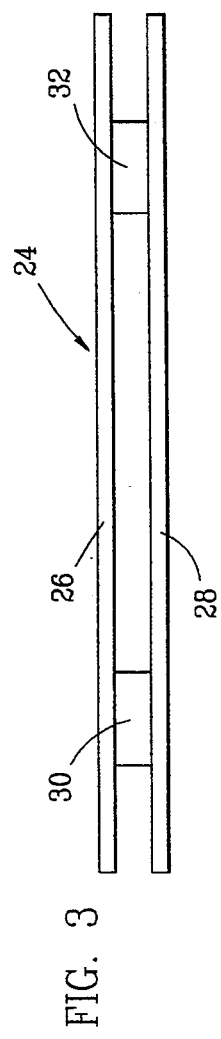
FIG. 3 is an end view of a single weighing slat utilized in the apparatus of FIG. 1.
Figure 4:
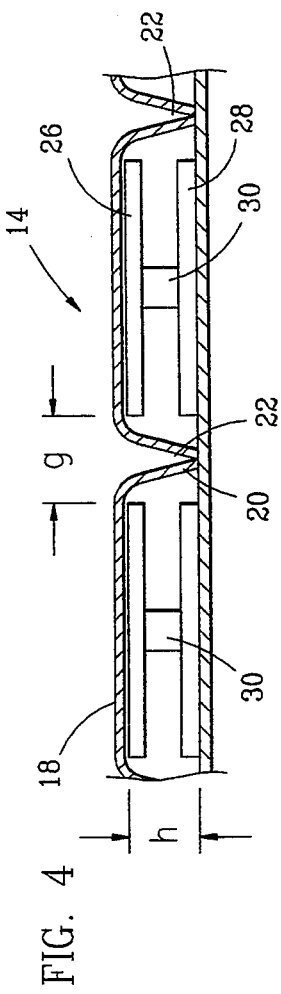
FIG. 4 is a side view of the scale illustrated in FIGS. 1 through 3.
Figure 2:
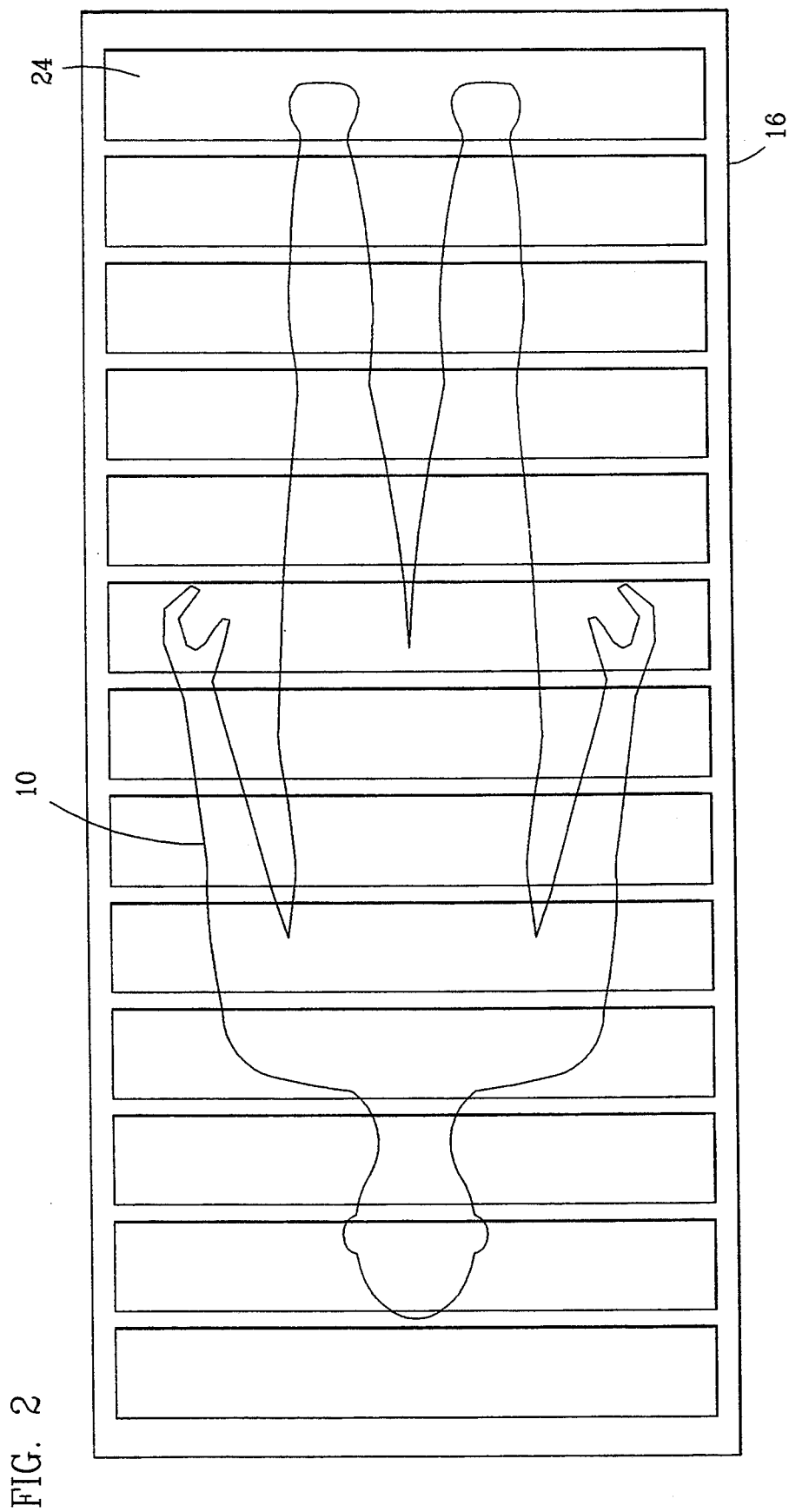
FIG. 2 is a plan view of the installed apparatus of FIG. 1.

One of the individual weighing slats 24 is depicted in FIG. 3 and consists of an upper beam 26 and a lower beam 28 having a length as seen in FIG. 3, extending across the entire width of the scale 14. The beams 26 and 28 are mounted spaced apart by load cells 30 and 32 positioned equidistant on opposite sides of the center of slat 24. In this arrangement, relative deflections of the upper beam 26 with respect to lower beam 28 produce signals in each of the load cells 30 and 32. As a vertical load is applied to upper beam 26, deflections of the beam 26 produce load cell signals corresponding to the magnitude of the applied load. Of course, to the extent that the loading of any weighing slat 24 is off center, there is variance in signals between load cells 30 and 32. Thus, both signals must be utilized to produce accurate weight information. It is important that each weighing slat 24 be relatively small compared to the combined height of mattress 12 and carrier 18, to prevent interference with the effectiveness of bed rails. At the same time, however, the gap "g" between adjacent weighing slats, as seen in FIG. 4, is controlled by the dimension of pockets 22, would be relatively small with respect to height "h". Gap "g" should not exceed more than about 200% of the height "h", in order that the mattress contact the bed frame through the gap. The pockets 22 are dimensional to provide this gap control.

Figure 5:
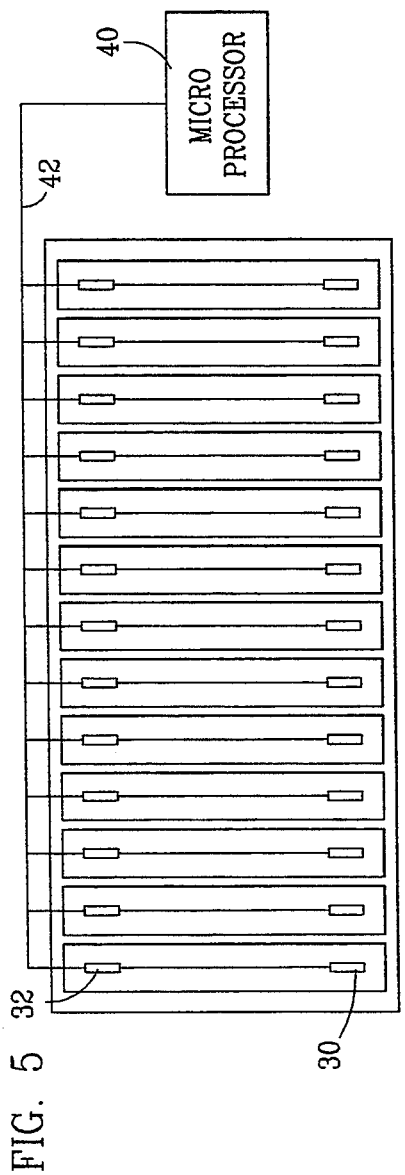
FIG. 5 is a schematic view of the system of FIGS. 1 through 4.

FIG. 5 schematically depicts a simple arrangement for deriving weight information from scale 14. A microprocessor 40 is provided at some location convenient to the bed, and is connected by line 42 to each pair of load cells 30 and 32. With the circuit thus arranged, the input to microprocessor 40 will simply be the net sum of the signals from all load cells. When the load cells are calibrated, the microprocessor will be enabled to provide reasonably accurate information as to the weight of the patient lying atop the mattress 12 under which scale 14 is positioned.

Figure 6:
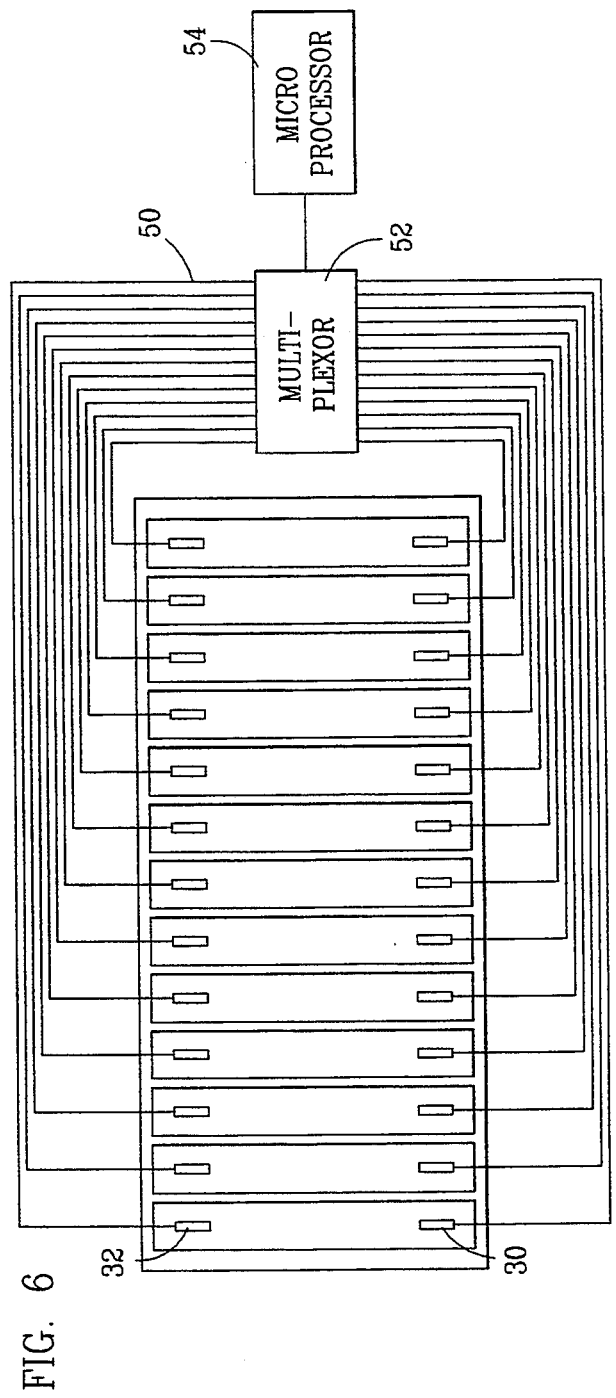
FIG. 6 is a schematic view of a modification of the system of FIG. 5.

FIG. 6 shows a somewhat more sophisticated schematic for processing data from load cells 30 and 32. In this arrangement, the signals from each individual load cell 30 or 32 are separately fed along lines 50 to a multiplexer 52 in turn connected to microprocessor 54. This arrangement enables data from each individual load cell to be analyzed by the microprocessor. In the event that a particular cell proves to be defective, weight information may still be provided by microprocessor 54 by averaging the signals from adjacent slats 24 on either side of the defective slat.

More significantly, the arrangement of FIG. 6 permits analysis by microprocessor 54 of relative right or left weighting of the scale. The scale is thus adaptable to use as a moving out of bed alarm. When the signals from the scale indicate comparative values exceeding a preset threshold of differential between one side of the center line of the bed and the other, the microprocessor 54 will produce an alarm at the nursing station indicating the patient has moved to one side of the bed. Of course, even the simpler system illustrated in FIG. 5 may be utilized as an out of bed alarm, with the microprocessor 40 indicating the alarm condition when a change in overall weight reading exceeds a predetermined threshold.

It will be appreciated from the foregoing disclosure that the invention has many attractive features when compared to the state of the art of bed weighing systems for patients. It is not necessary to permanently equip the bed with any mechanism, or to wheel cumbersome weighing devices from room to room. The device may readily be transported and stored in rolled up condition, and placed into operation simply be unrolling it and placing it under a patient mattress. When in operative position, the scale does not interfere with the normal articulation of a hospital bed, and indeed is not noticeable by the patient. Nevertheless, it is capable of acceptable accuracy in monitoring patient weight on a day to day basis. In one embodiment, the scale may also provide a moving out of bed alarm.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A portable scale for a patient bed, comprising:
   (a) a flexible carrier of size generally corresponding to the bed, and being adapted to removable placement on the bed;
   (b) a plurality of weighing slats positioned in the carrier in parallel array extending transversely of the carrier, each weighing slat having an upper beam and a lower beam movably spaced apart by at least two load cells, the load cells being located toward opposite ends from the center of the slat to measure loading forces causing deflection of the upper beam with respect to the lower beam when a vertical load is applied to the slat; and
   (c) means for receiving signals from the load cells, and for calculating the magnitude of a load placed on the scale.

2. The scale of claim 1, wherein the carrier has a plurality of pockets for receiving the weighing slats and controlling the gap between adjacent weighing slats.

3. The scale of claim 1, wherein the carrier maintains a maximum gap between adjacent weighing slats of no more than 200% of the relaxed height of the slats.

4. The scale of claim 1, wherein the width of each weighing slat is no more than about seven inches.

5. The scale of claim 1, wherein the width of each weighing slat is approximately five inches.

6. The scale of claim 1, wherein the number of weighing slats is at least ten, whereby the scale may be transported by rolling up the carrier.

7. A combination portable scale and moving out of bed alarm for a patient bed, comprising:
   (a) a flexible carrier of size generally corresponding to the bed, and being adapted to removable placement on the bed;
   (b) a plurality of weighing slats positioned in the carrier in parallel array extending transversely of the carrier, each weighing slat having an upper beam and a lower beam movably spaced apart by at least two load cells, the load cells being located toward opposite ends from the center of the slat to measure loading forces causing deflection of the upper beam with respect to the lower beam when a vertical load is applied to the slat;
   (c) means for receiving signals from the load cells, and for calculating the magnitude of a load placed on the scale; and
   (d) means for comparing signals from the load cells on opposite sides of the slats to produce an alarm when the comparison indicates signals from one side of the bed exceeding signals from the other side by a preset threshold.

8. The scale of claim 7, wherein the carrier has a plurality of pockets for receiving the weighing slats and controlling the gap between adjacent weighing slats.

9. The scale of claim 7, wherein the carrier maintains a maximum gap between adjacent weighing slats of no more than 200% of the relaxed height of the slats.

10. A combination portable scale and moving out of bed alarm for a patient bed, comprising:
 (a) a flexible carrier of size generally corresponding to the bed, and being adapted to removable placement on the bed;
 (b) a plurality of weighing slats positioned in the carrier in parallel array extending transversely of the carrier, each weighing slat having an upper beam and a lower beam movably spaced apart by at least two load cells, the load cells being located toward opposite ends from the center of the slat to measure loading forces causing deflection of the upper beam with respect to the lower beam when a vertical load is applied to the slat;
 (c) means for receiving signals from the load cells, and for calculating the magnitude of a load placed on the scale;
 (d) means for comparing signals from the load cells on opposite sides of the slats to produce an alarm when the comparison indicates signals from one side of the bed exceeding signals from the other side by a preset threshold; and
 (e) means for comparing signals from the load cells at different times and for sounding an alarm when the comparison indicates a change in the signals.

* * * * *